(12) United States Patent
Kucka et al.

(10) Patent No.: US 12,445,058 B2
(45) Date of Patent: Oct. 14, 2025

(54) DC/DC CONVERTER AND A METHOD FOR OPERATING A DC/DC CONVERTER

(71) Applicant: ECOLE POLYTECHNIQUE FEDERALE DE LAUSANNE (EPFL, Lausanne (CH)

(72) Inventors: Jakub Kucka, Ecublens VD (CH); Drazen Dujic, Paudex (CH)

(73) Assignee: Ecole Polytechnique Federale De Lausanne (EPFL), Lausanne (CH)

(*) Notice: Subject to any disclaimer, the term of this patent is extended or adjusted under 35 U.S.C. 154(b) by 258 days.

(21) Appl. No.: 18/029,471

(22) PCT Filed: Sep. 21, 2021

(86) PCT No.: PCT/EP2021/075931
§ 371 (c)(1),
(2) Date: Mar. 30, 2023

(87) PCT Pub. No.: WO2022/073757
PCT Pub. Date: Apr. 14, 2022

(65) Prior Publication Data
US 2023/0378880 A1    Nov. 23, 2023

(30) Foreign Application Priority Data

Oct. 7, 2020   (EP) ................................ 20200583

(51) Int. Cl.
*H02M 3/335*   (2006.01)
*H02M 1/00*    (2006.01)

(52) U.S. Cl.
CPC ..... *H02M 3/33584* (2013.01); *H02M 1/0009* (2021.05)

(58) Field of Classification Search
CPC . H02M 3/3358; H02M 1/0009; H02M 1/0058
See application file for complete search history.

(56) References Cited

U.S. PATENT DOCUMENTS 10,587,201 B1   3/2020   Chen
11,031,897 B1*  6/2021   Meyer ..................... H02M 7/06
(Continued)

OTHER PUBLICATIONS

International Search Report and Written Opinion in international patent application No. PCT/EP2021/075931, mailed Oct. 12, 2021, 10 pages.
(Continued)

*Primary Examiner* — Adolf D Berhane
*Assistant Examiner* — Afework S Demisse
(74) *Attorney, Agent, or Firm* — Blueshift IP; Robert Plotkin

(57) ABSTRACT

The present invention relates to a DC/DC converter (1) for transferring an active power between two DC subsystems (5, 6) comprising: —a first converter stage (3) and a second converter stage (4) both configured to be selectively operated as an active inverter or as a passive rectifier; —an AC coupling circuit (2) for coupling the first and the second converter stage (3, 4) by means of an AC power transfer; and —a control unit (10) configured to switch the operation mode of the first and second converter stages (3, 4) depending on a measurement of an amount of power transfer through the AC coupling circuit (2).

9 Claims, 5 Drawing Sheets

(56) References Cited

U.S. PATENT DOCUMENTS 12,034,376 B2 * 7/2024 Lai ......................... H02M 1/08
2015/0015181 A1 1/2015 Kondo
2017/0324334 A1 11/2017 Fujihata

OTHER PUBLICATIONS

J. Jung et al., "Design methodology of bidirectional CLLC resonant converter for high-frequency isolation of dc distribution systems," IEEE Transactions on Power Electronics, vol. 28, No. 4, pp. 1741-1755, 2013.

K. Tan et al., "Optimal design methodology of bidirectional LLC resonant dc/dc converter for solid state transformer application," in IECON 2014—40th Annual Conference of the IEEE Industrial Electronics Society, 2014, pp. 1657-1664.

* cited by examiner

DC/DC CONVERTER AND A METHOD FOR OPERATING A DC/DC CONVERTER

TECHNICAL FIELD

The present invention relates to bidirectional DC/DC converters, particularly to control methods for an operation of DC/DC converters that leads to a natural power transfer in the correct direction.

TECHNICAL BACKGROUND

Due to the numerous disadvantages of the AC grid network and in view of the dropping costs for power electronic converters, DC grids are becoming a conceivable solution for small to a large-scale power distribution. For DC power distribution networks, a DC/DC conversion is used to change the voltage level of network subsystems further preferably providing a galvanic isolation between the DC subsystems. Nowadays, DC power distribution networks are already common in specialized applications, such as railway and marine power distribution networks or high capacity data server facilities.

A key factor of large-scale DC grids is the general availability of power electronics DC/DC converters (serving as DC transformers) which are required for providing isolated interconnection between the DC grid subsystems. The requirements for DC transformers resemble that of conventional and simple (non-solid-state) AC transformers and basically allow a natural transfer of power according to the state of the connected subsystem grids. The idea here is that the DC transformer should behave as a conventional AC transformer (two windings and core). Substantially, the DC transformers need to exhibit a high efficiency, a galvanic isolation, an unrestricted voltage conversion, and the possibility of a bidirectional power transfer between both sides of the DC/DC converter.

DC grids of such a power distribution network may be interconnected using an open-loop operated LLC resonant converter serving as a DC transformer. Such LLC resonant converter has a resonant tank consisting at least of two inductors (that might be integrated in a transformer) and one capacitor and is switched with a constant 50% duty cycle with a switching frequency near or at a resonant frequency of the resonant tank. According to the power transfer direction, only one of the converter power stages is actively switched, while the other one is set inactive or operated to act as a passive rectifier.

The LLC resonant converter topology can generally be extended with a medium frequency transformer to satisfy basic requirements, such as a load-independent stiff voltage ratio and a galvanic isolation.

One main benefit of such an LLC resonant converter topology is that it naturally transfers power without any external setpoints and without any control loops. To enable a power transfer in both directions of the DC/DC converter, both sides of the converter have to be designed as an active converter stage that is capable of both passive rectification and active inverting. Typically, the LLC resonant converter has two converter stages coupled by means of a resonant tank. The converter stages are formed by active semiconductor devices forming a circuitry according to a voltage source topology. The passive rectification is commonly achieved by intrinsic antiparallel diodes of the voltage source topologies of the used semiconductor devices. To provide a power transfer from one converter stage to the other, one of the converter stages has to be switched as an active inverter while the other one acts as a passive rectifier. Therefore, when the power transfer direction has to be changed, the converter stage operated as an active inverter will be switched off to obtain a passive rectification while the converter stage operated as a passive rectifier is controlled to operate as an active inverter.

Usually, the problem of deciding the correction operation power transfer direction is handled by a power flow controller which provides the information about its setpoint and accordingly controls the operation of the converter stages, as e.g. known from J. Huang et al., "Implementation of bidirectional resonant DC transformer in hybrid AC/DC microgrid," IEEE Transactions on Smart Grid, vol. 10, no. 2, pp. 1532-1542, 2019. This way, the required power direction is well known and thus, the correct operation direction of the DC converter can be determined easily. A problem may occur when the connected power-converter stage cannot follow its setpoint correctly and the operation direction is decided wrongly. Furthermore, the method is only applicable when the setpoints are externally determined and well known, which is not the case for many applications.

However, for cases where no power flow controller exists, the DC/DC converters have to make an own decision about the correct power flow direction. One common approach, which is e.g. disclosed in J. Jung et al., "Design methodology of bidirectional CLLC resonant converter for high-frequency isolation of dc distribution systems," IEEE Transactions on Power Electronics, vol. 28, no. 4, pp. 1741-1755, 2013, relies on a voltage gain observation which compares the voltages on both sides of the DC/DC converters and decides the power flow direction depending on the ratio of these voltages. However, in the DC/DC converters of the open-loop-operated LLC converter type, the voltage ratio characteristics is quite flat (stiff) so that it is difficult to obtain a precise measurement of the voltage gain. This might lead to a situation where at low power transfers the operation direction might be estimated wrongly. So, the correct power flow direction might be estimated too late when there is a high voltage gain mismatch which might cause a high inrush current through the LLC converter and the resonant tank which can be destructive or introduce disturbances in the DC power distribution network.

Another popular option to allow a power transfer in both power flow directions is proposed in K. Tan et al., "Optimal design methodology of bidirectional LLC resonant dc/dc converter for solid state transformer application," in IECON 2014-40th Annual Conference of the IEEE Industrial Electronics Society, 2014, pp. 1657-1664. This approach is based on a concurrent switching of both converter stages with the resonant frequency. Since the power flow can change naturally between the converter stages, the roles of the rectifying stage and the inverting stage are not strictly defined. Since the rectifying stage is, however, not passive, at least it needs to be ensured that the resonant frequency is matched very well. Otherwise, the natural power flow is affected and unwanted power flow may be established. A potential disadvantage of this method is that both power converter stages have to be actively switched permanently. Particularly, when using bipolar devices such as IGBT, GTO, IGCT for the converter stages, switching losses in the converter stages can be increased.

It is an object of the present invention to provide a DC/DC converter of an open-loop LLC converter type which has an improved performance when switching between operation modes due to a change of the power transfer direction.

SUMMARY OF THE INVENTION

The object described above has been achieved by a DC/DC converter of an open-loop LLC type according to claim 1 and by a method for operating a DC/DC converter according to the further independent claim.

Further embodiments are indicated in the dependent subclaims.

According to a first aspect, a DC/DC converter for transferring an active power between two DC subsystems is provided, comprising:
- a first converter stage and a second converter stage both configured to be selectively operated as an active inverter or as a passive rectifier;
- an AC coupling circuit for coupling the first and the second converter stage by means of an AC power transfer; and
- a control unit configured to switch the operation mode of the first and second converter stages depending on a measurement of an amount of power transfer through the AC coupling circuit.

Furthermore, the AC coupling circuit may include a resonant tank, wherein particularly the AC coupling circuit includes a medium or high frequency operated transformer.

DC converters of the LLC type are operated in open loop with a constant switching frequency and therefore no external power setpoint may be given. As a consequence, the power transfer direction which determines which one of the converter stages has to be actively switched and operated as an active inverter needs to be decided internally. Above DC/DC converter decides about the power flow direction by observing the amount of power transfer over the AC coupling circuit.

Furthermore, the control unit may be configured either in a first operation mode to actively operate the first converter stage and not to operate the second converter stage so that it acts as a rectifier, or, in a second operation mode, to actively operate the second converter stage and not to operate the first converter stage so that it acts as a rectifier.

Particularly, the control unit may be configured to switch from the first operation mode to the second operation mode if a power transfer flow is from the second converter stage into the AC coupling circuit and/or to switch from the second operation mode to the first operation mode if a power transfer flow is from the first converter stage into the AC coupling circuit.

It may be provided that the control unit is configured to switch from the first operation mode to the second operation mode if a power transfer flow from the second converter stage into the AC coupling circuit is below a given second threshold and/or to switch from the second operation mode to the first operation mode if a power transfer flow from the first converter stage into the AC coupling circuit is below a given first threshold.

An idea is that once the transferred power drops below a certain threshold, the currently active converter stage is deactivated and the respective other converter stage is operated to act as an active inverter. This guarantees that the DC/DC converter operates in the correct power direction when the absolute value of the transferred power is above the defined power transfer threshold. When the amount of the required power transfer, however, is below the defined threshold, the bridges are activated/deactivated alternately, delivering the required power flow as a long-period mean value. This intermitting or transient period will depend on the rate of the change of the power.

One possible and efficient way to observe the AC power transfer through the AC coupling circuit is by observing the current flow through the AC coupling circuit.

Moreover, a first current sensor between the first converter stage and the AC coupling circuit may be provided to measure a first absolute value of a peak current amplitude flowing into the AC coupling circuit and/or wherein a second current sensor between the second converter stage and the AC coupling circuit is provided to measure a second absolute value of a peak current amplitude flowing into the AC coupling circuit.

So, as the current on the side of the currently active converter stage includes a current component of the magnetizing current that does not transfer any power, the current through the AC coupling circuit is measured at the converter stage which is operated as a passive rectifier to estimate whether the power transfer threshold has been crossed.

Particularly, the control unit may be configured to switch from the first operation mode to the second operation mode if a second absolute value of the peak current amplitude is below a given second peak current threshold value and/or to switch from the second operation mode to the first operation mode if a first absolute value of the peak current amplitude is below a given first peak current threshold value.

According to an embodiment, the control unit may include a state machine.

According to another aspect, a method for operating a DC/DC converter for transferring DC power between two DC subsystems is provided comprising:
- a first converter stage and a second converter stage both configured to be operated as an active inverter or as a passive rectifier;
- an AC coupling circuit for coupling the first and the second converter by means of an AC power transfer;

the method comprising the steps of:
- switching the operation mode of the first and second converter stages depending on a measurement of an amount of power transfer through the AC coupling circuit.

Moreover, in a first operation mode, the first converter stage may be actively operated and the second converter stage may be not operated so that it acts as a rectifier, and, in a second operation mode, the second converter stage may be actively operated and the first converter stage may be not operated so that it acts as a rectifier, wherein it is switched from the first operation mode to the second operation mode if a power transfer flow from the second converter stage into the AC coupling circuit is below a given second threshold and/or it is switched from the second operation mode to the first operation mode if a power transfer flow from the first converter stage into the AC coupling circuit is below a given first threshold.

BRIEF DESCRIPTION OF THE DRAWINGS

Embodiments are described in more detail in conjunction with the accompanying drawings in which.

DESCRIPTION OF EMBODIMENTS

Figure 1:
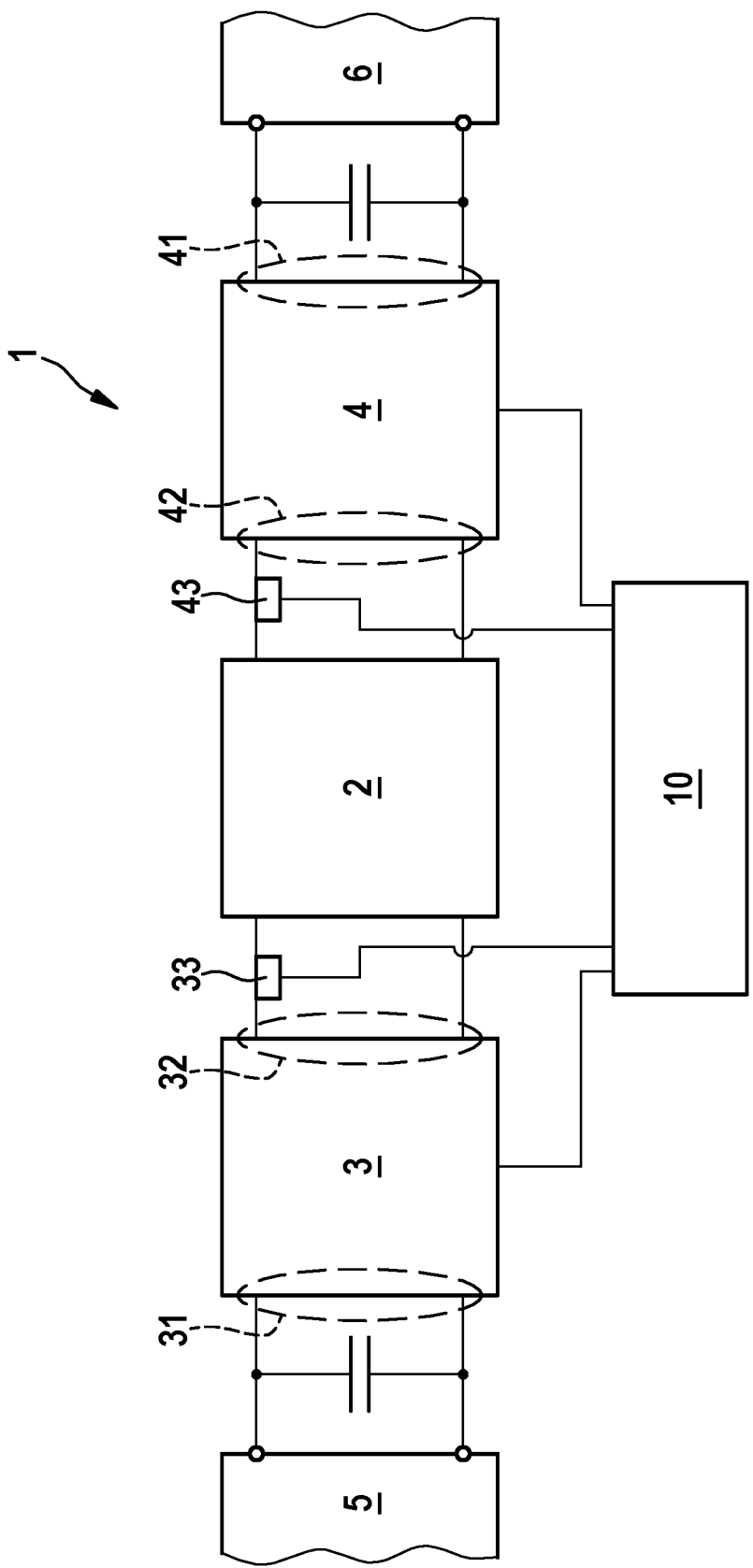
FIG. 1 schematically shows a design of a DC/DC converter.

The basic configuration of a DC/DC converter 1 with a resonant tank 2 as an AC coupling unit is schematically shown in FIG. 1.

FIG. 1 shows a first converter stage 3 and a second converter stage 4 which are coupled via the AC coupling unit 2. The first converter stage 3 has a first terminal 31 to be connected to a first DC subsystem 5. A second terminal 32 of the first converter stage 3 is coupled to the AC coupling unit 2.

The second converter stage 4 substantially is configured similar. The second converter stage has a first terminal 41 to be connected to a second DC subsystem 6. A second terminal 42 of the first converter stage 3 is coupled to the AC coupling unit 2.

The first and second converter stages 3, 4 are configured to be actively operated to act as an active converter, thereby transforming a DC voltage at the respective first terminal 31, 41 to an AC voltage at the respective second terminal 32, 42. When the converter stages 3, 4 are not actively operated they act as passive rectifiers.

Figure 2:
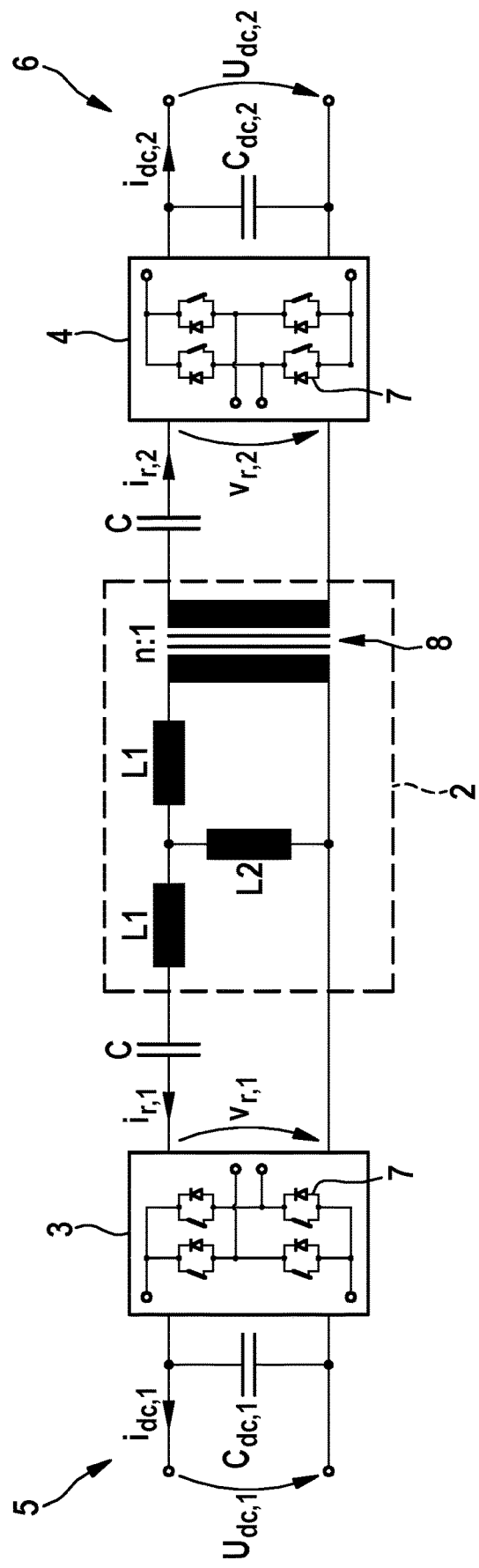
FIG. 2 a more detailed view of the circuitry of the DC/DC converter according to an embodiment.

In FIG. 2, the DC/DC converter from FIG. 1 is shown in more detail in an exemplary configuration. The exemplary configuration, as shown in FIG. 2, has the first and second converter stages 3, 4 configured as H-bridges with semiconductor devices 7, such as MOSFETs, IGBTs, GTOs, IGCTs or the like. These semiconductor devices 7 include an intrinsic diode which will become effective in case the semiconductor devices of the respective converter stage 3, 4 are not actively operated thereby rendering the converter stage to act as a passive rectifier. Particularly, the diodes form a diode bridge with the known rectifying characteristics.

In one mode of operation, an input DC voltage $u_{dc,1}$ is applied onto the DC side of the first converter stage 3 which results in an input DC current Power transfer is from the first converter stage 3 to the second converter stage 4 which results in an output DC voltage $u_{dc,2}$ at the output formed by the second converter stage 4 with an output DC current $i_{dc,2}$.

Analogously, in another mode of operation, an input DC voltage $u_{dc,2}$ is applied onto the DC side of the second converter stage 4 which results in an input DC current $i_{dc,2}$. Power transfer is from the second converter stage 4 to the first converter stage 3 which results in an output DC voltage $u_{dc,1}$ at the output formed by the first converter stage 3 with an output DC current $i_{dc,1}$.

DC voltage variations may be buffered by the capacities $C_{dc,1}$ and $C_{dc,2}$.

Figure 3C:
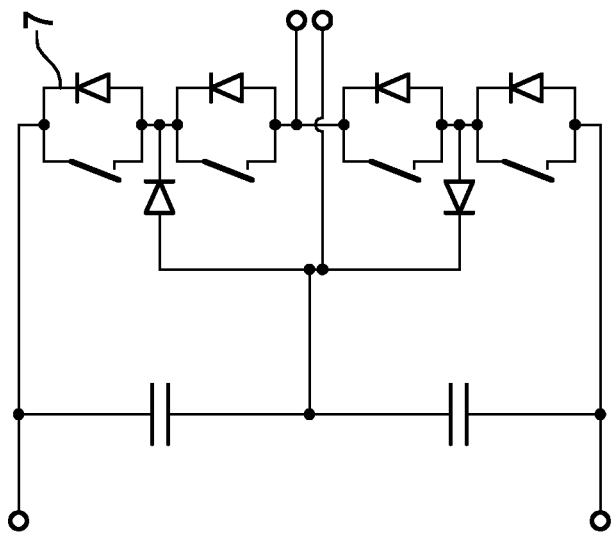
FIGS. 3a to 3c different exemplary configurations of a converter stage as used in the DC/DC converter of FIG. 1.
Figure 3B:
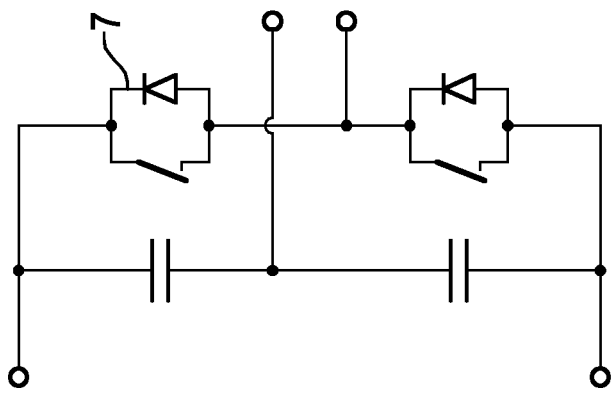
Figure 3A:
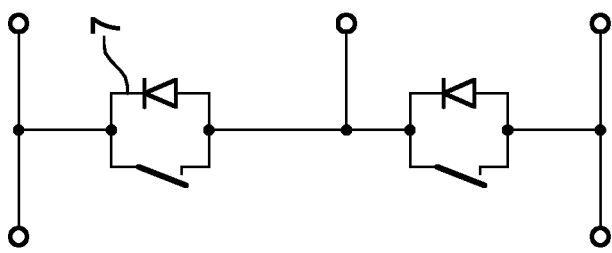
Figure 4:
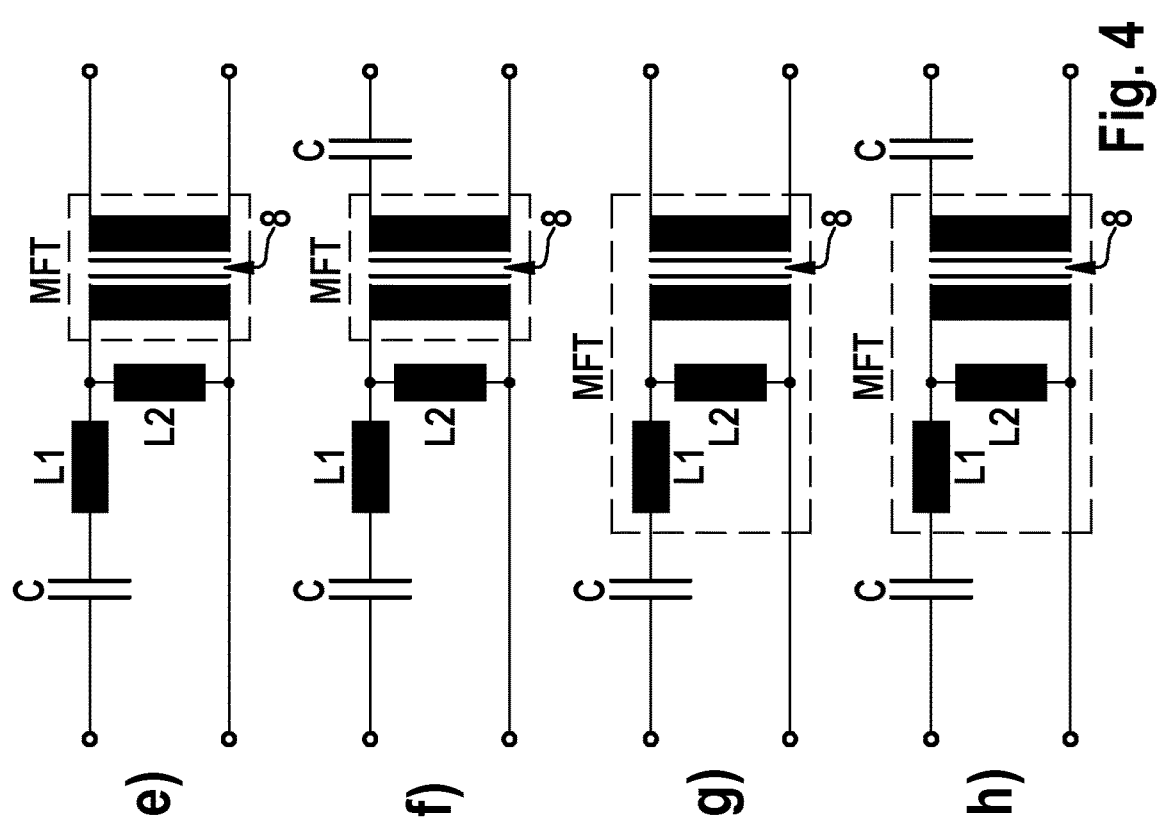
FIGS. 4a to 4h possible configurations of resonant tanks of the DC/DC converter according to FIG. 1.
Figure 4:
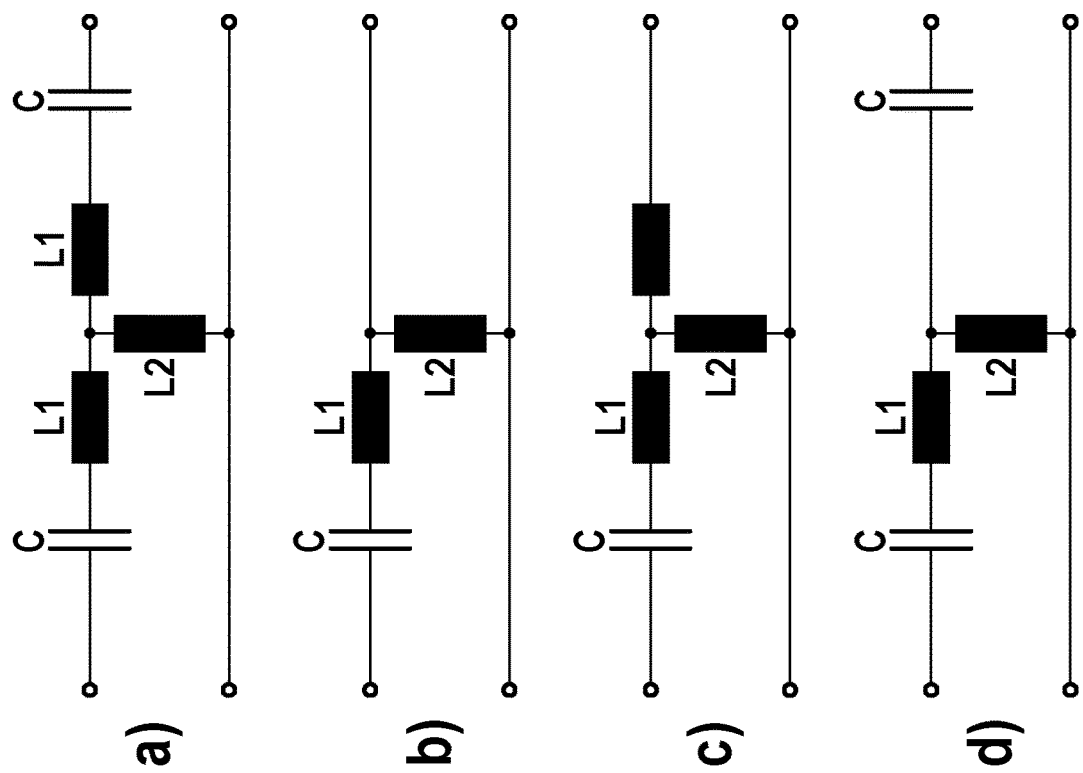

Further embodiments of the configuration of converter stages are shown in the circuits of FIGS. 3a to 3c wherein the configuration of converter stages 3, 4 may include a half-bridge configuration (FIG. 3a), a half-bridge configuration with a center tap capacitor (FIG. 3b) and a three-level voltage source converter (FIG. 3c) as known in the art. Basically, the invention is applicable for any kind of power electronics converter stage which may generate at least two voltage levels.

As shown in FIG. 2, the AC coupling unit 2 is configured as a resonant tank. The resonant tank is shown as a combination of one or more capacitors C and one or more inductivities L1, L2, L3 . . . and might include a medium frequency transformer 8 for a voltage level transformation. The resonant tank at least has one series capacitor C and a series inductance L1 as well as a parallel inductance L2.

Other configurations of the LLC resonant tank are shown in FIGS. 4a to 4h wherein the configurations of FIGS. 4e to 4h include a transformer while the configurations of FIGS. 4a to 4d directly interconnecting the converter stages 3, 4 without any galvanic insulation.

The medium frequency transformer 8 defines the voltage ratio between the first DC subsystem 5 and the second DC subsystem 6

With reference to FIG. 2, a control unit 10 is provided which is connected to the converter stages 3, 4 to operate the converter stages 3, 4 as an active inverter or as a passive rectifier selectively. When operating the converter stage 3, 4 actively, the semiconductor devices are switched concurrently with a given switching frequency fs at a duty cycle of 50% as known in the art. The result is an AC voltage at the respective second converter terminal 32, 42. The switching frequency is selected to be at or close to the resonant frequency of the resonant tank 2.

Furthermore, a first current sensor 33 may be provided at the second terminal 32 of the first converter stage 3 and a second current sensor 43 may be provided at the second terminal 42 of the second converter stage 4. Preferably, the current sensors 33, 43 may be configured to detect the current amplitude. An easy method to obtain the current amplitude is to use a current to voltage converter rectifying the sensor voltage and deriving the peak voltage therefrom. Another option can be to measure the peak current at a timing of one fourth and/or three fourths of the switching period after the start time of the switching period since the current characteristics is commonly sinusoidal starting with a current of 0 at the start time of each switching period.

Basically, the control unit 10 checks the direction of the power transfer flow through the resonant tank 2 and determines the operation mode of the converter stages 3, 4 correspondingly. The control unit 10 may be operated as a state machine which determines within one switching period 1/fs which substantially corresponds to the resonance frequency of the resonant tank 2 about the peak value of the current flow into the rectifier side.

The DC/DC converter 1 is therefore operated in a two-mode operation wherein one of the converter stages 3, 4 is switched actively to act as an inverter applying an AC voltage its second terminal while the correspondingly other converter stage 4, 3 is operated as a passive rectifier.

Figure 5:
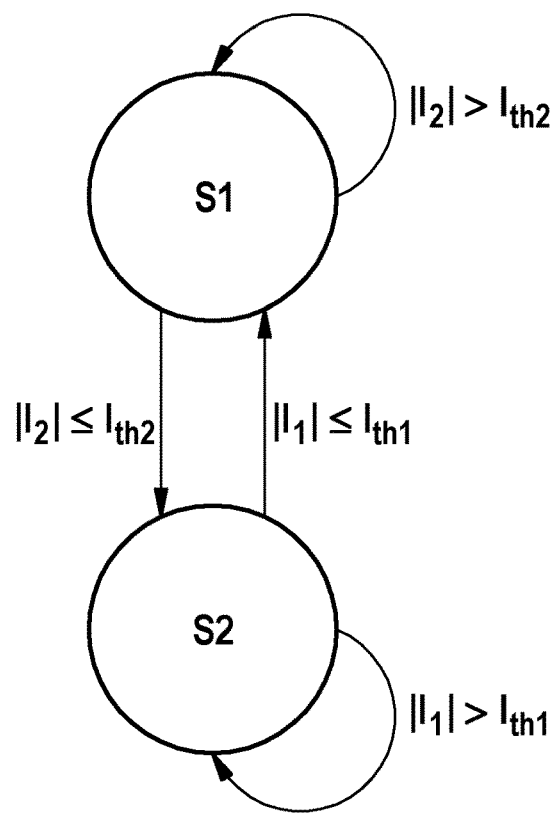
FIG. 5 a diagram of the operation of the state machine of the control unit.

In conjunction with FIG. 5, a process flow for the state machine in the control unit is described. Starting with stage S1 with a mode of operation where the first converter stage 3 is actively operated as an inverter, while the second converter stage 4 is passively operated as a rectifier.

In the current switching period, an absolute value of the peak current $I_2$ into the resonant tank 2 is detected on the rectifier side (second converter stage 4) by the second current sensor 43 and compared to a second predetermined peak current threshold value $I_{th2}$. The second peak current threshold value $I_{th2}$ for the peak currents are set to ensure that the offsets of the current sensors 33, 43 cannot cause an assumption of a non-existent power flow. This can be achieved by selecting the peak current threshold values with a sufficient margin from a worst case offset and a noise of the current sensors 33, 43 and the utilized analogue digital converters.

Once it is determined that the absolute value of the second peak current amplitude $I_2$ is below the provided second peak current threshold value $I_{th2}$, a switching of the operation mode of the DC/DC converter is performed by transferring to stage S2. Accordingly, the first converter stage 3 is switched passive, while the second converter stage 4 changes its mode to an active inverter. If it is determined that the absolute value of the second peak current amplitude $I_2$ is not below the provided second peak current threshold value $I_{th2}$, the stage S1 is maintained.

In stage S2, for the next switching period, an absolute value of the peak current $I_1$ into the resonant tank 2 is detected on the rectifier side (first converter stage 3) by the first current sensor 33 and compared to a first predetermined peak current threshold value km.

If it is determined that the absolute value of the first peak current amplitude $I_1$ is not below the provided first peak current threshold value km, the stage S2 is maintained.

Using the current sensor which is related to the converter stage which acts as a rectifier has the advantage that only the peak current value indicating the current amplitude of the respective resonance is sufficient for the decision about the power transfer direction.

The first and second peak current threshold value $I_{th1}$, $I_{th2}$ may be basically the same. However, if a medium frequency transformer 8 with a winding ratio different to 1 is used the peak current threshold values may be preset with the same ratio.

Figure 6:
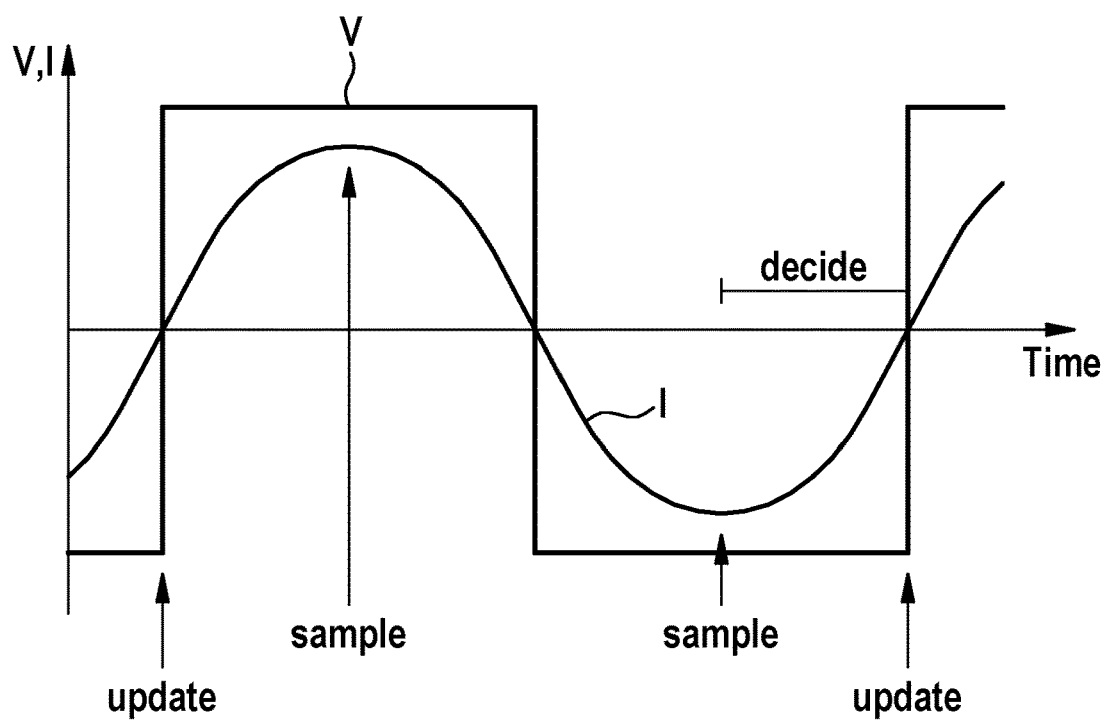
FIG. 6 a timing diagram of an exemplary characteristics of the current and voltage at an output of a converter stage.

In FIG. 6, an example for the timing of one switching period is shown. While the active inverter provides a rectangular voltage signal, the resulting current flow into the resonant tank 2 almost follows a sinus characteristic due to the impedances of the resonant tank.

The operation mode as described above is particularly not sensitive to gain errors, since these only virtually change the peak current threshold value, thus increase or decrease the power range in which the alternating operation is present. Therefore, not capturing the measured current value exactly at the peak can viewed as a small gain error and thus is not critical either.

In a preferred embodiment, the peak current amplitude $I_1$ ($i_{r,1}$ in FIG. 2), $I_2$ ($i_{r,2}$ in FIG. 2) is detected once per switching period, however, the current amplitude can be detected two times per switching period related to the rising and falling edges to improve the response time of the DC/DC converter. In practical applications, the sensor offset can be corrected from drifting, since the measured current is an AC current so that a mean value of known peak values can be used to compensate the sensor drift.

Furthermore, some measurement redundancy can be achieved by removing a predicted magnetizing current value from the measured current of the active bridge. If required, the peak resonant current can also be estimated by measuring the change of the corresponding resonant capacitor voltage at the rising and falling edges. Then, the switchover current peak thresholds values may be set according to the voltage sensor noise to ensure the required operation direction is estimated correctly.

The invention claimed is:

1. A DC/DC converter (1) for transferring an active power between two DC subsystems (5, 6) comprising:
   a first converter stage (3) and a second converter stage (4) both configured to be selectively operated as an active inverter or as a passive rectifier;
   an AC coupling circuit (2) for coupling the first and the second converter stage (3, 4) by means of an AC power transfer; and
   a control unit (10) configured to switch the operation mode of the first and second converter stages (3, 4) depending on a measurement of an amount of power transfer through the AC coupling circuit (2),
   wherein the amount of power transfer is detected by a current flow through the AC coupling circuit (2),
   wherein a first current sensor (33) between the first converter stage (3) and the AC coupling circuit (2) is provided to measure a first absolute value of a peak current amplitude (I1) flowing into the AC coupling circuit (2) and/or wherein a second current sensor (43) between the second converter stage (4) and the AC coupling circuit (2) is provided to measure a second absolute value of a peak current amplitude (12) flowing into the AC coupling circuit (2).

2. The DC/DC converter (1) according to claim 1, wherein the control unit (10) is configured either in a first operation mode to actively operate the first converter stage (3) and not to operate the second converter stage (4) so that it acts as a rectifier, or, in a second operation mode, to actively operate the second converter stage (4) and not to operate the first converter stage (3) so that it acts as a rectifier.

3. The DC/DC converter (1) according to claim 2, wherein the control unit (10) is configured to switch from the first operation mode to the second operation mode if a power transfer flow is from the second converter stage (4) into the AC coupling circuit (2) and/or to switch from the second operation mode to the first operation mode if a power transfer flow is from the first converter stage (3) into the AC coupling circuit (2).

4. The DC/DC converter (1) according to claim 2, wherein the control unit (10) is configured to switch from the first operation mode to the second operation mode if a power transfer flow from the second converter stage (4) into the AC coupling circuit (2) is below a given second threshold and/or to switch from the second operation mode to the first operation mode if a power transfer flow from the first converter stage (3) into the AC coupling circuit (2) is below a given first threshold, wherein particularly the first and the second threshold are identical.

5. The DC/DC converter (1) according to claim 1, wherein the control unit (10) is configured to switch from the first operation mode to the second operation mode if a second absolute value of the peak current amplitude (12) is below a given second peak current threshold value (Ith2) and/or to switch from the second operation mode to the first operation mode if a first absolute value of the peak current amplitude (I1) is below a given first peak current threshold value (Ith1).

6. The DC/DC converter (1) according to claim 1, wherein the control unit (10) includes a state machine.

7. The DC/DC converter (1) according to claim 1, wherein the AC coupling circuit (2) includes a resonant tank, particularly an LLC resonant tank, wherein particularly the AC coupling circuit (2) includes a medium or high frequency transformer (8).

8. A method for operating a DC/DC converter (1) for transferring DC power between two DC subsystems (5, 6) comprising:
   a first converter stage (3) and a second converter stage (4) both configured to be operated as an active inverter or as a passive rectifier;
   an AC coupling circuit (2) for coupling the first and the second converter stage (3, 4) by means of an AC power transfer;
   the method comprising the steps of:
   detecting the amount of power transfer by measuring a current flow through the AC coupling circuit (2);
   measuring, using a first current sensor (33) between the first converter stage (3) and the AC coupling circuit (2), a first absolute value of a peak current amplitude (I1) flowing into the AC coupling circuit (2) and/or measuring, using a second current sensor (43) between the second converter stage (4) and the AC coupling circuit (2), a second absolute value of a peak current amplitude (12) flowing into the AC coupling circuit (2); and switching the operation mode of the first and second converter stages (3, 4) depending on a measurement of an amount of power transfer through the AC coupling circuit.

9. The method according to claim 8, wherein in a first operation mode, the first converter stage (3) is actively operated and the second converter stage (4) is not operated so that it acts as a rectifier, and, in a second operation mode, the second converter stage (4) is actively operated and the first converter stage (3) is not operated so that it acts as a rectifier, wherein it is switched from the first operation mode to the second operation mode if a power transfer flow from the second converter stage (4) into the AC coupling circuit (2) is below a given second threshold and/or it is switched from the second operation mode to the first operation mode if a power transfer flow from the first converter stage (3) into the AC coupling circuit (2) is below a given first threshold.

* * * * *